(12) United States Patent
Vandor (10) Patent No.: US 7,870,746 B2
(45) Date of Patent: Jan. 18, 2011

(54) SYSTEM AND METHOD FOR LIQUID AIR PRODUCTION, POWER STORAGE AND POWER RELEASE

(75) Inventor: David Vandor, Tarrytown, NY (US)

(73) Assignee: Expansion Energy, LLC, Tarrytown, NY (US)

( * ) Notice: Subject to any disclaimer, the term of this patent is extended or adjusted under 35 U.S.C. 154(b) by 437 days.

(21) Appl. No.: 12/127,520

(22) Filed: May 27, 2008

(65) Prior Publication Data

US 2009/0293502 A1 Dec. 3, 2009

(51) Int. Cl.
*F17C 3/08* (2006.01)

(52) U.S. Cl. .............................. 62/45.1; 62/94; 62/271

(58) Field of Classification Search ................. 62/45.1, 62/50.2, 94, 271, 402, 476, 615, 640, 636; 165/104.21, 129; 60/727, 728
See application file for complete search history.

(56) References Cited

U.S. PATENT DOCUMENTS

| | | | |
|---|---|---|---|
| 2,760,356 A | | 8/1956 | Sixsmith |
| 3,631,673 A | | 1/1972 | Charrier et al. |
| 3,742,716 A | | 7/1973 | Backstrom |
| 3,757,517 A | | 9/1973 | Rigollot |
| 4,329,842 A | | 5/1982 | Hoskinson |
| 4,455,834 A | | 6/1984 | Earle |
| 5,251,450 A | * | 10/1993 | Agrawal et al. ............... 62/646 |
| 5,384,489 A | * | 1/1995 | Bellac ......................... 290/44 |
| 5,495,709 A | | 3/1996 | Frutschi |
| 5,537,822 A | | 7/1996 | Shnaid et al. |
| 5,626,019 A | | 5/1997 | Shimizu et al. |
| 6,155,078 A | * | 12/2000 | Miyashita et al. ............. 62/643 |
| 6,244,072 B1 | * | 6/2001 | Rathbone ..................... 62/646 |
| 6,389,814 B2 | * | 5/2002 | Viteri et al. ................... 60/716 |
| 6,920,759 B2 | | 7/2005 | Wakana et al. |
| 7,043,920 B2 | * | 5/2006 | Viteri et al. ................... 60/716 |
| 7,250,691 B2 | * | 7/2007 | Enis et al. ..................... 290/55 |

(Continued)

FOREIGN PATENT DOCUMENTS

WO    2007096656 A1    8/2007

OTHER PUBLICATIONS

Chino, K., Araki H., "Evaluation of Energy Storage Method Using Liquid Air", abstract of journal, dated 1999.

*Primary Examiner*—Mohammad M Ali
(74) *Attorney, Agent, or Firm*—Eric L. Lane; Luce, Forward, Hamilton & Scripps LLP (57) ABSTRACT

Systems and methods for releasing and replacing stored energy comprise capturing inlet air from the ambient environment so the inlet air flows in a first general direction. Released liquid air flows in a second general direction, the second general direction being substantially opposite to the first general direction. The released liquid air is pumped to pressure, and the released liquid air and inlet air flow past each other such that heat exchange occurs. The inlet air warms the released liquid air such that the released liquid air is substantially vaporized, and the released liquid air cools the inlet air. Moisture and carbon dioxide are removed from the inlet air, and the inlet air is compressed and cooled such that the inlet air is substantially liquefied. The substantially liquefied air replaces a portion of the released liquid air; and the substantially vaporized released liquid air is combusted with fuel to produce electricity.

15 Claims, 2 Drawing Sheets

U.S. PATENT DOCUMENTS

| | | |
|---|---|---|
| 2001/0004830 A1 | 6/2001 | Wakana et al. |
| 2005/0198961 A1 | 9/2005 | Shirk et al. |
| 2006/0254287 A1 | 11/2006 | Greenberg et al. |
| 2006/0260312 A1 | 11/2006 | Ingersoll |
| 2007/0186563 A1 | 8/2007 | Vandor et al. |
| 2008/0047271 A1 | 2/2008 | Ingersoll |
| 2008/0216510 A1 | 9/2008 | Vandor et al. |
| 2009/0113928 A1 | 5/2009 | Vandor et al. |
| 2009/0226308 A1 | 9/2009 | Vandor |

* cited by examiner

SYSTEM AND METHOD FOR LIQUID AIR PRODUCTION, POWER STORAGE AND POWER RELEASE

FIELD OF THE INVENTION

The present invention relates to power storage, release and replacement systems and methods.

BACKGROUND OF THE INVENTION

Wind power is desirable because it is renewable and typically cleaner than fossil fuel power sources. Wind turbines capture and convert the energy of moving air to electric power. However, they do so unpredictably and often during low power demand periods when the value of electric power is substantially lower than during peak demand periods. Without a way to achieve certainty of delivery during peak demand periods (also known as "firm" power), and without a way to store low-value off-peak power for release during high-value peak periods, the growth of wind power (and other intermittent renewable power sources) may be constrained, keeping it from reaching its full potential as part of the world's overall power generation portfolio.

Even in the most wind-rich locations, the duration, daytime vs. nighttime availability, and the wind's "density" are unpredictable. Without power storage, there is no certainty of the wind providing firm power during any selected peak (or off-peak) consumption period. Thus, there is a need for a utility-scale power storage system that can guarantee firm power output during peak consumption periods, particularly where there is an increasing reliance on (or adoption of) intermittent renewable power sources.

Operating wind turbines (or other intermittent renewable power assets) adjacent to and in conjunction with a natural gas—(NG) fired turbine can yield 100% certainty of power, because the NG turbine can "back up" the wind. However, that approach will yield a reduced environmental rating, based on the hours of operation for the NG turbine and may be economically unfeasible because the two power output systems need to be fully redundant, and thus capacity utilization and economic return-on-assets is diminished. Most importantly, neither a standard wind farm nor a back-up NG turbine(s) can "store" the wind power that may be widely available during the off-peak periods.

A further disadvantage of intermittent power sources such as wind is that they can cause system "balance" problems if allowed onto the transmission grid, which is a major hurdle for new (particularly renewable) power generation sources to clear. Thus, there is a need for wind power storage and release systems having improved efficiency and predictability, while remaining cost-effective to deploy on a large scale (i.e., "utility scale").

A disadvantage of other types of utility-scale power sources is that they produce large and unnecessary amounts of power during off-peak periods or intermittently. For example, base-load coal-fired and nuclear power plants continue to produce power at night at approximately the same rate of generation that they do during the day, even though far less power is needed at night than during the day. Cost-effective utility-scale power storage solutions that can release power during peak demand periods would dramatically increase the value of existing base-load power generation assets because power producers can typically charge significantly more for power sold during the day versus selling it during the night. Moreover, such a storage and release system would diminish the need to add new base-load coal or nuclear power capacity to meet growing power demand. It would also lower the consumption of fossil fuels and nuclear fuel by producing more "usable" kilowatts of power per unit of fuel consumed to produce the power, contributing significantly to the reduction of air pollutants, carbon emissions and hazardous/radioactive waste that result from today's base-load power plants. Such a utility-scale storage and release system would also contribute greatly to the more rapid adoption and broader deployment of other renewable power sources that produce power intermittently or during off-peak periods, such as solar, landfill gas anaerobic digesters, wave/tidal, and waste-to-energy power generation systems, among others.

Another major disadvantage of existing power systems is that transmission lines often become "clogged" or overloaded (particularly as it relates to transmitting intermittent power, like wind power), and transmission systems can become unbalanced. One existing solution for overloaded transmission lines is transferring power by "wheeling," which is the delivery of a specific quantity of power to each end-user, allowing any "power product" to enter the power transmission system and be used to "balance" any other product that was removed from the system. A disadvantage of using current storage systems for wheeling is that power production occurs during all hours (most of which are not peak demand hours), and does not substantially overlap with peak demand hours. Another disadvantage is that transmission of power, which occurs at all hours (most of which are not peak demand hours), also does not substantially overlap with peak demand hours.

Thus, there is a need for an energy storage and release system that can help to alleviate the problem of transmission lines becoming overloaded by allowing power to be stored near the point of production or near the point of consumption (or at any point in between), which also allows the power that will be stored to be moved across transmission systems during off-peak transmission periods (such as at night) and thereby reducing the power "traffic" that moves across transmission lines during peak demand periods.

The few utility-scale power storage systems that exist today (or have been proposed previously) also have major disadvantages such as inefficient heat and cold recovery mechanisms, particularly those that require multiple systems for hot and cold storage media. Another disadvantage is extra complexity in the form of many expanders and compressors often on the same shaft with "clutches" that allow some front-end elements to be disconnected from the back-end elements on the same shaft. Thus, there is a need for more efficient hot and cold storage recovery mechanisms and simpler, more efficient compression and expansion systems that allow the compressors to operate independently of the hot gas expanders and do not require complex clutch systems to turn on and off.

Some existing power plants use a simple cycle gas turbine with a recuperator, where a front-end compressor is on the same shaft as the hot gas expander that compresses the inlet air. However, in that configuration some 63% of the power output is devoted to compressing inlet air. Thus, there exists a need for a system that can reduce the amount of power output required to compress inlet air.

Therefore, there exists a need for a system that can provide certainty and a firm, consistent energy output from any power source, particularly intermittent power sources such as wind. There is also a need to provide a convenient storage system for power that can be used in connection with power generation sources, particularly intermittent power sources such as wind turbines, but also for any power source that generates large amounts of power during off-peak periods. There is a further need for a power storage and release assembly having more efficient hot and cold recovery mechanisms and simpler, more efficient, compression and expansion systems.

SUMMARY OF THE INVENTION

The present invention, in its many embodiments, alleviates to a great extent the disadvantages of known power storage systems by providing a system for storing, releasing and replacing energy using liquid air (L-Air) for storage and using the L-Air and ambient air for heat exchange purposes. Embodiments of the present invention provide energy efficient storage, replacement and release capabilities by cooling and warming air through heat exchange, recovering both hot and cold from the system, storing energy as liquid air and pumping liquid air to pressure. The "gathering" of wind and energy from other intermittent power sources and converting it to liquid air for storage and release during daily peak periods guarantees its availability as "firm" power, alleviating many of the disadvantages of known power storage and release systems.

Embodiments of the present invention are referred to herein as Vandor's Power Storage (VPS) Cycle. The VPS Cycle includes methods of storing power, energy release and replacement systems and methods, and methods of providing firm power delivery. An embodiment of the VPS Cycle's method of storing power comprises directing inlet air through a vertical cold flue assembly having an air inlet at or near its top into which the inlet air is directed and an exit at or near its bottom. The inlet air sinks downward from the top of the cold flue assembly to the bottom of the cold flue assembly. The storage method further includes the steps of cooling the air within the cold flue assembly and removing a portion of the moisture from the air within the cold flue assembly. A preferred embodiment of the present invention comprises a cold flue assembly having an air inlet at or near its top and an exit point at or near its bottom, including an insulated aluminum plate fin heat exchanger configured to operate in a vertical manner (with the plates in an optimum, such as concentric circle, arrangement) so that the entire assembly resembles (in a horizontal cross sectional or plan view) a round "flue." Although use of the cold flue assembly is preferred, an ordinary plate fin heat exchanger in a horizontal configuration could be used in the power storage methods of the VPS Cycle.

The air is directed out the exit of the cold flue assembly. Then the air is compressed and the heat of compression recovered from the compressed air. Preferably, compression of the air includes two-stages of compression where the air is first compressed to a first pressure at this stage of the cycle and the heat of compression recovered from the compressed air. The remaining moisture and carbon dioxide (CO2) are removed from the air by adsorption, preferably using a molecular sieve assembly. Next, in a preferred embodiment, the air is compressed to a second pressure and the heat of compression is again recovered from the compressed air. The heat of compression from both compression stages may be directed to an absorption chiller to drive the chiller, which sends refrigerant to the cold flue assembly to help cool the inlet air. It should be noted that the compression could be performed in a single stage with some loss of efficiency or in three or more stages with efficiency gains but increased complexity and capital costs. A preferred embodiment of the storage method next comprises cooling the air in a main heat exchanger such that the air is substantially liquefied, the cooling substantially performed by a refrigerant air stream. Finally the substantially liquefied air is directed to a storage apparatus, preferably a liquid air storage tank.

A vapor portion of the substantially liquefied air in the storage apparatus, or "flash air" may be directed to the main heat exchanger, and recovered cold from the vapor portion used to cool the inlet air flowing in. This vapor portion would thus be warmed by the inlet air. The vapor portion is further warmed, preferably to approximately 250° F. and specifically by the heat of compression recovered from elsewhere in the Cycle, as discussed more fully below. The vapor portion may also be directed to the molecular sieve assembly and used to remove the carbon dioxide and moisture that had been collected there.

In a preferred embodiment, the refrigerant air stream flows through a connected loop from an independent refrigeration assembly comprising a plurality of compressors to compress the refrigerant stream and a plurality of expanders to cool the refrigerant stream. The refrigerant air stream may be directed from the main heat exchanger to the independent refrigeration assembly, which preferably is a closed loop system. The storage method also preferably comprises compressing the refrigerant air stream to a first pressure, while recovering the heat of compression, then compressing the refrigerant air stream to a second pressure and again recovering the heat of compression. However, one stage of compression of the refrigerant air stream is possible, but likely with a substantial loss of efficiency. The stream is then cooled and directed back to the main heat exchanger, where it cools the inlet air and is warmed by the inlet air. The refrigerant air stream is preferably air, as described in more detail herein, but other refrigerants known in the art may also be used.

In a preferred embodiment, an energy release and replacement system comprises one or more compressors. A single multi-stage compressor or a plurality of compressors may be used depending on the desired configuration. The system may also comprise a molecular sieve assembly fluidly connected to a first compressor. In a preferred embodiment, a vertical cold flue assembly is fluidly connected to the molecular sieve assembly and to a second compressor and has an air inlet at or near its top into which the inlet air is directed and an exit at or near its bottom. The cold flue assembly preferably consists of a plate fin heat exchanger and has an air inlet at or near its top into which the inlet air is directed and an exit at or near its bottom. The inlet air sinks downward from the top of the cold flue assembly through the plate fin heat exchanger and to the bottom of the cold flue assembly. Although use of the cold flue assembly is preferred, an ordinary plate fin heat exchanger in a horizontal configuration could be used in the VPS Cycle. The energy release and replacement system also comprises a plurality of heat exchangers including a main heat exchanger, preferably a cryogenic heat exchanger, fluidly connected to at least one of the plurality of compressors. A hot gas expander, which may be a multi-stage expander, is fluidly connected to at least one of the plurality of heat exchangers, and a generator is fluidly connected to the hot gas expander. The assembly further comprises a pump fluidly connected to the main heat exchanger and a liquid air storage tank fluidly connected to the main heat exchanger and the pump. As discussed throughout, the energy replacement and release assembly may be powered by one or more wind turbines (or other power production or energy conversion sources).

An embodiment of the VPS Cycle includes a method of releasing and replacing stored energy. Inlet air from the ambient environment is captured such that it flows in a first general direction. Stored liquid air is released from a storage apparatus such that the released liquid air flows in a second general direction substantially opposite to the first general direction in which the inlet air is flowing. The released liquid air is pumped to pressure, preferably by a cryogenic pump. The released liquid air and inlet air flow past each other such that heat exchange occurs between the two air streams. The inlet air warms the released liquid air by heat exchange such that the released liquid air is substantially vaporized, and the released liquid air cools the inlet air by heat exchange. Moisture and carbon dioxide are removed from the inlet air, preferably by a molecular sieve assembly, and the inlet air is compressed and cooled such that it is substantially liquefied. The substantially liquefied air flows into the storage apparatus and replaces at least a portion of the released liquid air. Ultimately, released liquid air, now substantially vaporized, is combusted with fuel to produce electricity.

A small percentage of the substantially liquefied air will "flash" as the liquid plus vapor enters the storage tank. That vapor portion of the substantially liquefied air, or flash stream, is directed from the liquid air storage tank to the main heat exchanger to cool the inflowing or inlet air. The vapor portion is warmed by heat recovered by the inlet air, preferably to approximately 250° F. and specifically by the heat of compression recovered elsewhere in the Cycle. After cold recovery the vapor portion of the substantially liquefied air is directed to the molecular sieve assembly where it removes carbon dioxide and moisture from the molecular sieve, which were deposited in the sieve by the inlet air.

Embodiments of the present invention include methods for providing firm power from intermittent energy sources such as wind turbines. The power to drive the compression steps and cooling steps of the method is provided by power production or energy conversion sources, which include, but are not limited to, wind power when such power is available, power from an electric grid or an independent power plant, nuclear, coal, geothermal, solar, hydropower, landfill gas, anaerobic digester gas, coal bed methane, associated gas, recovered heat from large industrial plants, recovered cold from liquid natural gas import terminals, wave and tidal energy. The method preferably includes both a replacement and a release aspect that can operate simultaneously.

A preferred method comprises capturing inlet air from the ambient environment and substantially liquefying the inlet air by cooling and compressing it and removing moisture and carbon dioxide. The substantially liquefied inlet air is then stored as liquid air. To release energy, the method then comprises the steps of releasing a portion of the stored liquid air and compressing the liquid air by pumping it to pressure. Pumping to pressure generally means pumping to a desired pressure. Here the term means using a pump, preferably a cryogenic pump, to pressurize the liquid air so the pressure is high enough so that the vaporized (formerly liquid) air arrives at a combustion chamber at the designed inflow pressure of the hot gas expander, while also accounting for pressure drop along the way. In a preferred embodiment the L-Air is pumped to approximately 440 psia by the cryogenic pump, and arrives at the hot gas expander, after losing some pressure in its travels through the various pipes and heat exchangers (pressure drop) at approximately 425 psia. Thus, the VPS Cycle sends pre-compressed air to the prime mover, eliminating the need for a front-end compressor and allowing almost all of the expander's power output to be sent to the grid or an adjacent end-user of the power.

Replacement inlet air is captured to replace at least a portion of the released liquid air. The release and replacement method further comprises cooling the replacement inlet air by heat exchange with the released liquid air such that the replacement inlet air is substantially liquefied and warming the released liquid air by heat exchange with the replacement inlet air such that the released liquid air is substantially vaporized. The substantially liquefied replacement air is then stored to replace the released liquid air. The substantially vaporized released liquid air is used in combustion to provide a combustion gas, typically a hot, high pressure gas. The method further includes expanding that combustion gas in one or more expanders, or expander stages, that drive a generator and may include reheating a portion of the expanded stream prior to a second stage of expansion.

The release and replacement method may further comprise directing the released liquid air to a generator and using it as a bearing for the generator's rotating components. The heat produced by the generator may be removed by absorbing the heat in the released liquid air. The released liquid air is also warmed using the recovered heat of compression and using exhaust gas from an expander. At this point, the released liquid air has become cool compressed air. Thereafter, the method includes the steps of directing the substantially vaporized released liquid air and a fuel stream to a combustion chamber and combusting the fuel with the air. The combustion gas, typically a hot, high pressure gas, is directed to one or more expanders, including one or more expander stages, which drive the generator. A portion of the exhaust gas from the expander also is used to warm the released liquid air.

Thus, the VPS Cycle captures and stores wind energy (or power generated from other sources) for later release. The "gathering" of wind power into a storage mode for release during daily peak periods guarantees its availability as "firm" power, mitigating the unpredictability and limited availability of wind and significantly raising its value. The ability to store wind and send it out on a firm basis during high-demand (high-value) periods makes wind a much more viable energy source. In addition, the VPS Cycle can store power produced from practically any source during off-peak consumption periods, for later release during peak consumption periods.

The VPS Cycle is based on the "equivalence" of wind and air. It leverages the kinetic energy of moving air (wind) into potential energy (L-Air), releasing that energy (by the addition of heat) as compressed air, and returning the former wind energy, now a hot gas, to its kinetic power-producing state. The VPS Cycle of the present invention captures the kinetic energy of air (in the case of wind), converts it to electricity, which powers compressors and refrigeration equipment that liquefy ambient air, storing it in a low-pressure cryogenic container as safe, environmentally benign L-Air. The "captured" energy is later released by vaporizing the pumped-to-pressure L-Air, using incoming moderately compressed air as a heat source, and further heating the compressed air by waste heat from a gas turbine, from the generator that loads the turbine, from the heat of compression, sending the hot compressed air to a combustion chamber where it combusts with natural gas (or any other fuel, including renewable ones like landfill gas (LFG) and anaerobic digester gas (ADG)), producing a very-hot exhaust stream that is expanded in a hot gas expander to recover (and add to) the energy that was first stored as L-Air.

The high thermal efficiency of the VPS Cycle is due to the heat and cold recovery methods described herein, which are possible because of the wide temperature range at which the Cycle operates. The Cycle is receptive to the re-use of large "quantities" (in BTUs) of low-grade (not especially hot) heat, as well as large quantities of not especially deep refrigeration.

The VPS Cycle achieves its storage goal by increasing the density of ambient air to the density of liquid air. The increased density substantially reduces the air's volume, allowing for its storage (and the resulting "storage" of its energy) in relatively moderately sized containers. Cooling the inlet air is a way of increasing its density, and rivals the density increasing effect of compressing the air. Chilling, if performed by recovered heat and cold, can achieve density increases with very little work input. On the basis of energy input, relative to the density achieved, refrigeration is the most efficient way to increase the density of air. Thus, embodiments of the present invention store the compressed air required by the combustion chamber as liquid air.

The wide temperature range of the VPS Cycle, from approximately −283° F. to approximately 2,000° F. allows each heat source within the Cycle (and each refrigeration source) to be more fully utilized by heat/cold recovery steps in the process. For example, in the VPS Cycle, the heat of compression during air inflow is an energy source for the absorption chiller, which helps pre-cool the inlet air. Similarly, the heat of compression that would normally be a parasitic loss in the air compressor and expander system that provides the bulk of the refrigeration input during off-peak period L-Air storage process is also recovered and sent to the absorption chiller. In that way, with "free" energy driving the absorption chiller, less energy is needed by the main refrigeration system.

Almost all of the heat content of the exhaust is recovered and used as the final pre-heating step before the compressed air arrives at the combustion chamber. With each such pre-warming of the inlet air, prior to its arrival at the combustion chamber, less fuel is needed to achieve the temperature needed by the hot gas expansion turbines for expanding the approximately 425-psia hot exhaust that is the product of the combustion of the air and fuel. The lower the fuel use, the lower the operating costs, the less emissions, and the higher the "green percentage" of the Cycle. The term "green" will be used herein to mean environmentally-friendly and/or renewable, not using fossil fuels and/or providing low to no carbon emissions.

On the cold side, during the power storage mode, the cold water that is knocked out of the inlet air in the cold flue serves a valuable pre-cooling function. The flash air that results from the L-Air's entry to the storage tank is a source of refrigeration that helps cool the incoming air. During outflow, the L-Air is vaporized by incoming compressed air, transferring the precious refrigeration from the vaporized air that will soon produce power to the inflowing air that will partially replace it in storage.

As mentioned above, embodiments of VPS Cycle use the high-pressure cool air as the bearing in the main power generator. This eliminates the need for an oil-bearing system for the generator, and substantially decreases the maintenance costs of the generator. Also the generator's waste heat warms the cool compressed bearing-air before it is sent further along in the Cycle for pre-warming, prior to the air's arrival at the combustion chamber.

In the VPS Cycle waste heat is not "dissipated" but recycled within the Cycle. The VPS Cycle does not need to "compress" air to provide a bearing surface for rotating equipment. Instead, the VPS Cycle creates pressurized air by pumping L-Air to pressure and then "lends" that compressed air it to the generator as a bearing fluid, prior to the air's power generation function in the hot gas expander. That use of the cool compressed air in the generator has no energy cost in the VPS Cycle.

The refrigeration loop of the present invention is a closed system that uses only air as the working fluid, but augmented by the stored refrigeration in an aqueous ammonia loop. The use of air as the major refrigerant is desirable because of the following: it is non-toxic, non-explosive, non-flammable, abundant, free, and requires no separate make-up refrigerant containers.

In the VPS Cycle make-up air is sent back into storage during power outflow. This helps recover the energy content of the out-flowing L-Air and blurs the boundary between the inflow and outflow batch functions, yielding a better use of the equipment. For example, the main heat exchanger will function during inflow and outflow making it useful during all portions of the VPS Cycle, with the exception of the short periods between inflow and outflow. Similarly, the inlet air compressors with their after-coolers, and associated air pre-cooling and mole sieve clean up system, and the program logic system, will operate during both inflow and outflow periods. The L-Air storage tanks will also be "working" all the time. In short, the capital cost of many of the key components will be well spent because those components will function during all phases of the Cycle.

Embodiments of the present invention are not limited to wind storage. It is applicable to all sources of off-peak energy that would benefit from "power storage", where low-value power would be stored for release during high-value, peak demand periods. With or without wind, the VPS Cycle need not be a "grid-based" storage system. It can also function as power storage at large commercial and industrial sites, converting low-value off-peak heat, cold and power to peek period power use, thus reducing the need for peak period high-cost power from the grid.

Thus, embodiments of the present invention provide energy storage methods and systems and energy release and replacement methods and systems to provide firm, consistent power from wind energy or other energy sources. These and other features and advantages of the present invention will be appreciated from review of the following detailed description of the invention, along with the accompanying figures in which like reference numerals refer to like parts throughout.

BRIEF DESCRIPTION OF THE DRAWINGS

The foregoing and other objects of the invention will be apparent upon consideration of the following detailed description, taken in conjunction with the accompanying drawings, in which.

DETAILED DESCRIPTION

In the following paragraphs, embodiments of the present invention will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations on the present invention. As used herein, the "present invention" refers to any one of the embodiments of the invention described herein, and any equivalents. Furthermore, reference to various aspects of the invention throughout this document does not mean that all claimed embodiments or methods must include the referenced aspects. Reference to temperature, pressure, density and other parameters should be considered as representative and illustrative of the capabilities of embodiments of the invention, and embodiments can operate with a wide variety of such parameters.

Figure 1:
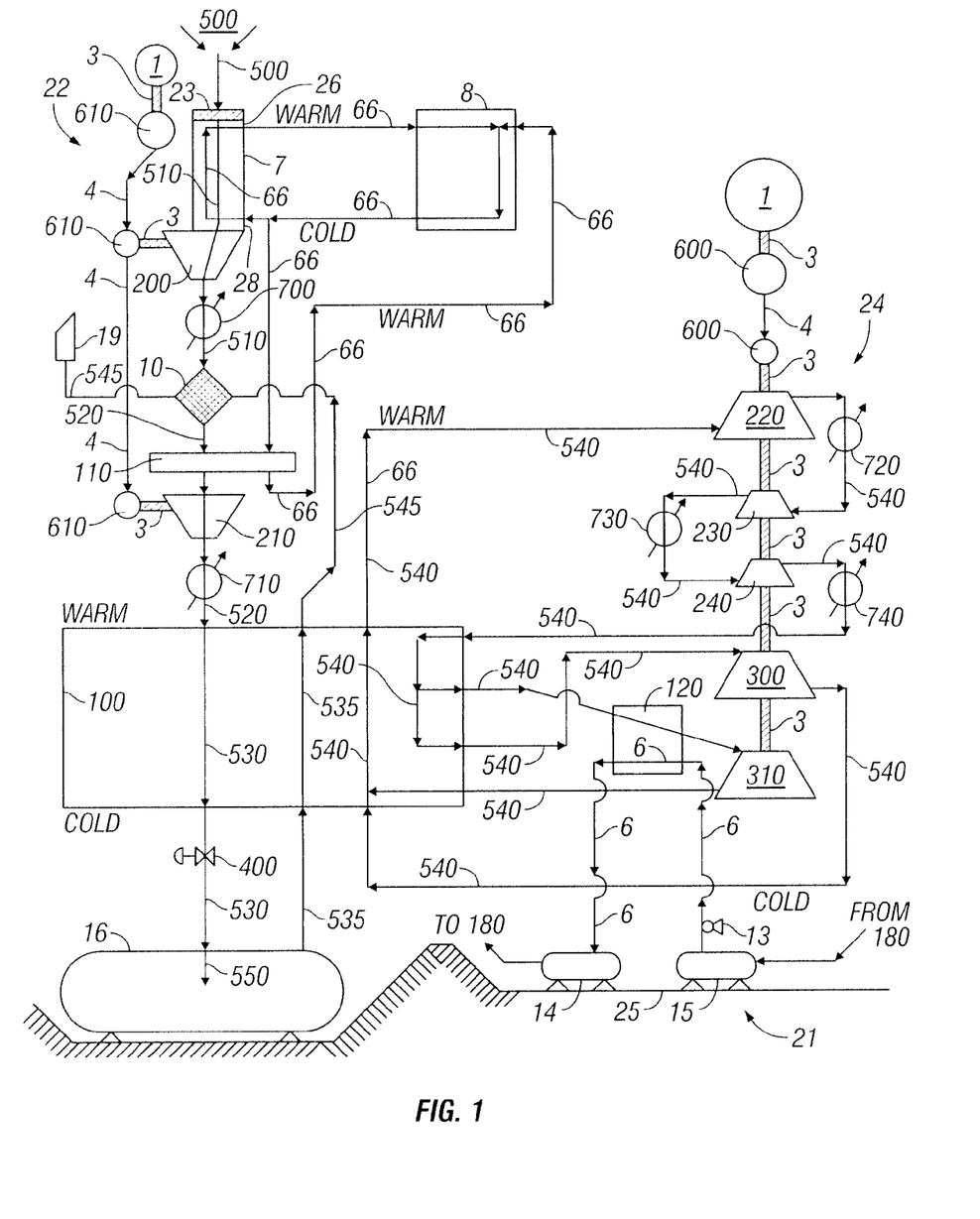
FIG. 1 is a process diagram of an embodiment of a power storage method and system in accordance with the present invention.

Referring to FIG. 1, an embodiment of a method and system for storing power is shown. The power storage system generally comprises compression, cooling and clean up system 22 and independent refrigeration system 24, with both systems fluidly connected via main heat exchanger 100, which is preferably a cryogenic heat exchanger. Cold flue assembly 7 is vertically oriented with a top and a bottom and includes a plate fin heat exchanger (not shown). The vertical plate fin heat exchanger preferably has concentric "nested" circular plates (not shown). In some embodiments, the plates are like barrels within barrels, with a manifold at the top and bottom to hold them in place. The plates preferably are separated by fins. The manifolds allow the various fluid streams to enter and exit the top, middle and bottom of cold flue assembly 7. The cold flue assembly 7 may include a protective cover and an air filter 23 at the top, and a set of condensation plates within the "flue". (Only the air filter 23, shown in a cross-hatched pattern is shown on FIG. 1.) Those condensation plates allow the moisture content of the falling and cooling air to condense at approximately 32° F., removing approximately 90% of the moisture content of the air, allowing the cold water to be circulated to the top of the cold flue to act as a refrigerant to pre-cool the incoming (warm) air, after which it is sent to a drain or to the cooling tower that serves the absorption chiller 8.

Instead of a normal flue that efficiently allows hot gases to rise to the top of the flue by "stack effect", the "cold flue" design allows the chilled air to sink through the top of the cold flue assembly, where it enters the flue at atmospheric pressure (approximately 14.7 psia) and warm temperatures (e.g., as warm as about 95° F.), laden with as much as about 55% relative humidity, and continues falling by gravity as it is chilled in the cold flue, sinking through the plate fin heat exchanger, increasing its density as it falls deeper into the flue, and reaching the bottom, sinking through the bottom and passing into an air compressor through the inlet to the compressor flange at sub-zero (F), with very little pressure drop, without the need for electric powered blowers and fans to move it along. It should be noted that an ordinary plate fin heat exchanger in a standard horizontal configuration could be used in the VPS Cycle instead of the cold flue assembly.

In a preferred embodiment, absorption chiller 8 is fluidly connected to cold flue assembly 7 at two locations so refrigerant may be directed to the cold flue assembly to cool the air that enters it, cycle through and then return to the absorption chiller to be re-cooled. Additional cooling is provided by a refrigerant stream 66, preferably cold aquas ammonia, which, after removing the heat from the falling air, is sent back to an absorption chiller for re-cooling. The colder the inflow air, the denser it is, and the less energy input will be required to compress it. It is that increasing density that, by gravity, allows the air to fall down the cold flue 7 toward the first compression, with very little pressure drop. The absorption chiller is "powered" by several heat recovery systems (heat exchangers) where the heat of compression is the heat source used by the absorption chiller. For the sake of clarity, those heat exchange loops are not shown. Instead, those sources of heat energy for the absorption chiller are shown as the various inter- and after-coolers at each compressor. The total storage capacity used for the aqueous ammonia at the power storage scales discussed here is preferably two approximately 50,000 gallon tanks, one for cold and on for warm ammonia. The two aqueous ammonia storage tanks preferably would be simple, low-pressure tanks (similar to propane tanks) but with a modicum of insulation applied to the outside of the cold tank. The two tanks also serve as the main make-up containers for the absorption chiller system, allowing any make-up ammonia to be delivered only infrequently to the VPS Cycle deployment site.

A first compressor 200 is directly below and fluidly connected to cold flue assembly 7. Compressor 200 is in fluid connection with first inter-cooler 700, which may provide waste heat to power the absorption chiller 8. The cooling and clean up system 22 of energy release and replacement system 20 further comprises molecular sieve assembly 10, which could be a multi-vessel configuration, a pre-cooling heat exchanger 110 and a second compressor 210 and first after-cooler 710. The first after-cooler 710 is fluidly connected to the main heat exchanger 100, which is in fluid connection with one or more of compressors 200 and 210 and storage apparatus 16, a tank suitable for storing liquid air.

The storage method will now be described. Inlet air 500 is directed through vertical cold flue assembly 7. The inlet air 500 enters the top 26 of the cold flue assembly, preferably from at least one wind turbine 1. Cold flue assembly 7 includes a plate fin heat exchanger (not shown). The inlet air 500 sinks downward through the plate fin heat exchanger and through the bottom 28 of the cold flue assembly 7. The "cold flue" design allows the chilled inlet air 500 to fall from the top, where it enters the flue and continues falling by gravity as it is chilled in the cold flue, increasing its density as it falls deeper into the flue, and reaching the inlet to the compressor flange at approximately 32° F., with very little pressure drop, without the need for electric powered blowers and fans to move it along. Refrigerant stream 66 cools the inlet air 500 as it passes through cold flue assembly 7. Thus, the inlet air 500 is cooled and moisture is removed from the air within the cold flue assembly 7.

The inlet air 500 (likely warm in the summer and cold in the winter) sinks to the bottom of cold flue assembly 7 and, as partially cooled air 510, enters the first compressor 200, or first stage of a multi-stage compressor, where it is compressed to a first pressure of approximately 35 psia. The heat of compression preferably is recovered and directed to absorption chiller 8 to drive the absorption chiller. The partially cooled inlet air 510, having given up approximately 90% of its moisture content continues to molecular sieve assembly 10 where its CO2 content and the remaining moisture are removed from the air by adsorption in zeolyte or other such materials known in the art. The molecular sieve assembly 10 may be a multi-vessel configuration, allowing for regeneration of one or more vessels while one or more of the remaining vessels remove the CO2 and moisture from the air stream.

Exiting the molecular sieve assembly 10, the dry inlet air 520 is further cooled by the absorption chiller and compressed to a second pressure of approximately 75 psia and after the removal and recovery of the heat of compression, as described above, moves on toward the main heat exchanger 100 at approximately +50° F. It should be noted that a single stage of compression of the air could work, but would likely yield reduced efficiency. Alternatively, three or more stages of compression could work and may yield better efficiencies but with added complexity and increased capital costs. As discussed below, the selected exit pressure from the second stage of compression (or single stage if performed with one compression stage) may vary and will depend on the selected storage temperature and pressure for the liquid air that is stored in storage tank 16. The cool (but not cold), dry, approximately 74 psia inlet air 520, with a very low CO2 content of approximately 1.0 parts per million, then enters the main heat exchanger 100 for cooling. The dry inlet air 520 is chilled to approximately −283° F., and having lost some pressure, exits the main heat exchanger 100 as substantially liquefied (and partially as a cold vapor) air 530 at approximately 73 psia, travels through cryogenic flow and pressure control valve 400 and enters a storage apparatus 16, preferably an insulated, cryogenic, L-Air storage tank(s) at approximately 70 psia and about −283° F. 75 psia was selected in this model so as to allow the liquid air that is produced by the in-flow cycle to be stored at that pressure in an L-Air storage tank, at about −283° F. Other storage pressures will yield other temperatures for the L-Air, and may be selected, in lieu of the about 70 psia, −283° F. conditions discussed here. In that event, the compression to approximately 75 psia in the second stage would be adjusted appropriately. Those decisions are "optimizations" that may be selected as part of the engineering process for each VPS cycle deployment. Another optimization might use three-stages of inlet air compression.

Approximately 8.5% of the inflowing substantially liquefied air 530 will "flash" as the liquid plus vapor enters the storage tank at approximately −283° F. and about 70 psia. While this vapor portion 535, or flash air, is quite cold, it is a small stream. Therefore, this cooling of the partially cooled inlet air 510 to substantially liquefied air 530 is performed by a refrigerant air stream. Independent refrigeration system 24 (with the assistance of stored cold in a cold storage medium such as aqueous ammonia or glycol-water) provides the bulk of the refrigeration required to liquefy the dry inlet air 520. In a preferred embodiment, independent refrigeration system 24 is a cryogenic air compression/expansion refrigeration system that uses bone dry air as the working fluid, but other fluid refrigerants may be used if desired. The independent refrigeration system 24 comprises a plurality of compressors 220, 230, 240 to compress the refrigerant air stream 540 and a plurality of expanders, shown here as first and second cryogenic air expanders 300, 310 to cool the refrigerant air stream. The plurality of compressors preferably includes a main multi-stage compressor 220 (preferably four-stage) and first and second booster compressors 230, 240 (or booster stages). The plurality of expanders may include two expander stages. The compressors and expanders preferably are all on the same shaft 3, powered by a wind-driven generator/motor 610 for the cooling and clean up system. Other configurations that separate the compressor stages and/or the expander stages onto multiple shafts with various power transmission systems are also feasible. The configuration shown is just one possible arrangement and was selected for the sake of clarity.

Figure 2:
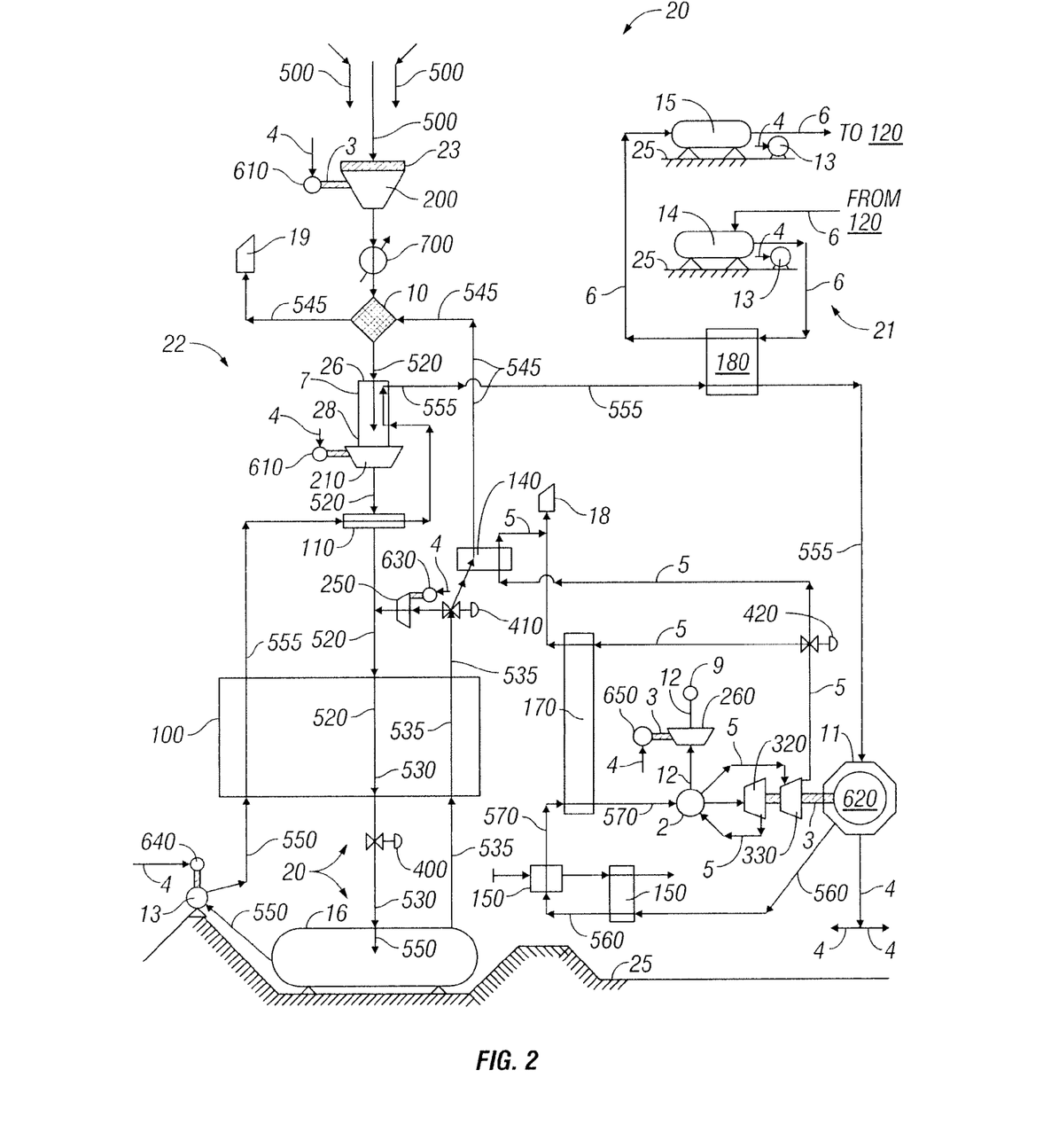
FIG. 2 is a process diagram of an energy release and replacement method and system in accordance with the present invention.

The refrigerant stream 540 exits the main cryogenic heat exchanger 100 and flows back to the independent refrigeration assembly 24, where it is compressed by the plurality of compressors 220, 230, 240 and the heat of compression is recovered by the energy flow assembly. The inflow refrigerant stream 540 sent to the main four-stage compressor 220 is approximately +40° F. and about 85 psia, having given up its "refrigeration content", in the main heat exchanger 100, to the substantially liquefied air 530 that is being liquefied for storage. FIG. 2 shows third inter-cooler 720 that recovers the heat of compression from multi-stage compressor 220. In reality that third inter-cooler 720 is a group of inter-coolers and an after-cooler, arranged after each stage of compression, but shown in FIG. 1 as a single unit for the sake of clarity. The stream is compressed to approximately 475 psia, inter- and after-cooled (as described above), and sent to a booster compressor 230, where it is compressed to a first pressure of approximately 600 psia, and the refrigerant air stream 540 exits the booster compressor at this pressure. The heat of compression is recovered by heat transfer (via heat exchanger) from the inter- or after-cooler to an appropriate place in the cycle, such as to the absorption chiller and to the flash air stream that regenerates the mole sieve. Then refrigerant air stream 540 is after-cooled in a fourth inter-cooler 730 and sent to a second booster 240, where it is compressed to a second pressure and exits that at approximately 800 psia, after-cooled and directed to the main heat exchanger 100 at approximately +50° F. It should be noted that the refrigerant stream could be compressed in one stage, but with a substantially reduced efficiency. As discussed elsewhere herein, the various inter- and after-coolers shown in FIG. 1 recover the heat of compression that is produced by the several compressors. Second after-cooler 740, for example, recovers the heat of compression produced by second booster compressor 240.

The stream is split in two within the main heat exchanger 100, with one stream exiting at approximately 0° F. and the other at approximately −150° F., with very little drop in pressure because the transit route through the heat exchanger is brief. Refrigerant air stream 540 is then cooled by the plurality of cryogenic air expanders 300, 310 and by heat exchange with a cold storage medium 6. In particular, the approximately −150° F. stream is sent through a cryogenic turbo-expander where it is cooled to about −290° F. by the "work" performed by the expansion of the air. The warmer (0° F.) stream is first heat exchanged with stored cold storage medium 6 and cooled to approximately −47° F. and then is sent to a second expander 310 (or second stage) where it is cooled to approximately −180° F. The cold storage medium 6 is available because it was cooled as part of the power sendout process, described below and shown in FIG. 2. Cold storage media may include any substance that stores cold or may be used as a refrigerant or cooling medium, including but not limited to aqueous ammonia or aqueous glycol. Both streams are expanded from approximately 800 psia to about 85 psia. The "work" produced by the expanders 300, 310 helps drive the compressors 220, 230, 240, thus reducing the total wind power required to drive this subsystem. The stored cold (contained in the ammonia sub-system) allows the approximately 11.7 MW of wind energy to produce approximately 9,500 gallons of L-Air per hour. That relatively high rate of L-Air 550 production allows the re-filling of the L-Air storage tanks 16 to occur in fewer hours out of the total available off-peak hours.

The refrigerant air stream 540 then flows from the independent refrigeration assembly 24 back to the main heat exchanger 100 to cool the inlet air to heat exchanger 100, producing substantially liquefied air 530. Specifically, the two streams that exit the expanders 300, 310 (one at about −180° F. and the other at about −290° F.) are sent back to the main heat exchanger 100 to cool the approximately +50° F. stream that left the last compressor stage of the independent refrigeration assembly 24 (as described above), but more significantly, to cool the main inlet air stream 520 from about +50° F. to about −283° F. The refrigerant air stream 540 is warmed in the main heat exchanger 100 by the heat contained in the inlet air stream 520 that is cooled and thus becomes substantially liquefied air 530. The "temperature approach" between the "refrigerant air" 540 at approximately −290° F. and the product L-Air 550 at about −283° F. is about 7-degrees. In other words, a −290° F. refrigerant (air) is cooling a product (air) to within 7 degrees of the refrigerant. That temperature approach is reasonable in well-designed plate fin heat exchangers. Storage tanks 14 and 15 contain "warm" and "cold" anhydrous ammonia or an alternative cold storage medium 6, which is pumped by pump 13, preferably a cryogenic pump, and sent from tank 15 to heat exchanger 120 to help provide extra refrigeration to the independent refrigeration system 24. Having absorbed heat from stream 540, the cold storage medium returns warmer to tank 14. The cooling of the cold storage medium is illustrated on FIG. 2 and shown as the recovered cold storage assembly 21.

As mentioned above, approximately 8.5% of the substantially liquefied air 530 will "flash" as the liquid plus vapor enters storage tank 16. That vapor portion 535 of the substantially liquefied air, or flash stream, is directed from the L-Air storage tank 16 and travels (at approximately 70 psia) to the main heat exchanger 100. There, the vapor portion 535 acts as one source of refrigeration, the recovered cold being used to further cool the dry inflowing or inlet air 520 described above. The inlet air 520 also warms the vapor portion 535 of the substantially liquefied air. After cold recovery and further heating from recovered heat, the warmed vapor portion 545, sometimes referred to as sweep air, is directed to the molecular sieve assembly 10 where it is used as a "sweep gas" to remove the carbon dioxide and moisture that has been deposited on the molecular sieve assembly 10. The warmed sweep air 545 that exits the molecular sieve 10 leaves the VPS Cycle by way of air vent 19. That sweep gas merely returns the CO2 and moisture content of the original inlet air 500 to the surrounding atmosphere. No additional CO2 or moisture is sent back through vent 19.

As discussed throughout, the various compressors generally are not driven directly by a wind turbine but by motors that receive electric power from wind turbines, from a small portion of the power output of the VPS Cycle, from a baseload power plant where the VPS Cycle may be deployed or from the electric grid during off-peak power demand periods. As is understood by those familiar with power production systems, generators and motors are essentially the same, but with one rotating in the opposite direction from the other. For example, FIG. 1 shows a wind turbine driving the independent refrigeration system generator 600 which in turn provides power by cable 4 to a motor 605, which drives the compressors on shaft 3, shown as independent refrigeration system 24. The independent refrigeration system motor 605 may get its power from any other power source, not just the wind turbine driven generator 600 shown above it.

It should be noted that FIG. 1 illustrates an embodiment of the inlet air compression, clean up, refrigeration and energy storage systems of the VPS Cycle. Much of the piping, valves, sensors, insulation, and other "hardware" and software that would be part of an engineered design of the same embodiment are not shown because all such aspects are well understood by gas processing and power production engineers. Similarly, the internal configurations for the absorption chiller, the inter- and after-coolers, the mole sieve, the expanders, compressors, generators and motors are not shown. Power cable connections 4 are shown in several places in FIG. 1, connecting power producing generators with motors that drive compressors. Other cables, not shown, would connect to instruments, electrically operated valves and the like.

Various other arrangements of the inflow/energy release and replacement system 20 using the same or similar components can be arranged to optimize the cost and performance of the system and to create a compact "footprint" at the deployment site. The scale of the VPS Cycle can also vary, possibly to under 10 MW of firm power output and up to hundreds of MW of output, where land is available for the required amount of L-Air storage.

Turning to FIG. 2, an energy release and replacement system and method, or energy send-out mode, is shown. FIG. 2 shows an energy release and replacement system and the Cycle's subsystems, but, for the sake of clarity, in a manner that does not show those elements that are dormant during outflow. For example the cryogenic refrigeration loop described above is not shown in FIG. 2, even though it would still be physically connected to the main heat exchanger 100. The absorption chiller is not shown because it is not needed during send-out. Similarly, a cryogenic pump shown in FIG. 2, as part of the outflow process, was not shown in FIG. 1, even though it is generally connected to the L-Air storage tank(s) 16 ready for service.

Also, FIG. 2 shows some of the same elements shown in FIG. 1 but in slightly different positions. For example, in FIG. 1, the cold flue assembly 7 is shown as the first component that meets the inlet air, whereas in FIG. 2, the cold flue assembly 7 is placed after the molecular sieve assembly 10. These two configurations are not contradictory and do not require that the cold flue be "moved" to accommodate the inflow and outflow modes. Again, it should be noted that an ordinary plate fin heat exchanger in a standard horizontal configuration could be used in the instead of the cold flue assembly. Rather, piping and valves will determine where the inlet air 500 is sent to in each Figure. In FIG. 1, the inlet air 500 is pre-cooled by the absorption chiller 8 to approximately +32 F., prior to the first stage of compression and prior to entering the molecular sieve assembly 10. In FIG. 2, the pre-cooling to about −110° F. occurs after the dry inlet air 520 is bone-dry (and contains no more than 1.0 ppm of CO2, to avoid freezing), because approximately −136° F. outgoing vaporized air does the pre-cooling.

The left side of FIG. 2 shows the cooling and clean up system, which consists of the same elements (not duplicate ones) shown for the inlet air system in FIG. 1 but operating at a lower rate of L-Air production. The make up air system has three important roles: first, to help vaporize all of the outgoing L-Air that has been pumped to pressure; second, to recover as much of the refrigeration content of the outgoing L-Air as practical, by cooling inflowing make-up air; and third, to partially replace the outgoing L-Air, so as to reduce the need for full availability of wind during the off-peak period. As a consequence of those important tasks, a relatively small amount of the power output during send-out is used to run the inlet compressor, pumps, and other miscellaneous equipment.

The inflow process for the make up air is essentially the same as described above for off-peak inflow. The main difference is that instead of the absorption chiller providing pre-cooling and independent refrigeration assembly 24 providing the remaining refrigeration, the out-flowing L-Air 550 and cold pressurized air 555 are the only refrigeration source. As mentioned above, this helps vaporize the outgoing L-Air and recovers much of the refrigeration energy of the sent out air.

On the one hand the VPS Cycle needs replacement air to help vaporize the out-going L-Air. On the other hand the system should not spend precious daytime power to compress a lot of incoming air, and to replace all of the outgoing L-air, because then it would not be able to take the "free" wind energy at night and use it to replace the sent out L-Air. Thus, a preferred embodiment of the present invention seeks an optimum balance between no replacement air during send-out, and full replacement air, finding that balance at approximately ⅓ replacement. Either extreme (full replacement or no replacement) would not work. The ⅓ middle ground allows the system to discharge about ⅔ of the L-Air in storage (accounting for the ⅓ replacement) thus opening up the off-peak hours for more "free" energy input, but allowing that input to occur over about 11-hours out of the 16 off-peak hours that are available, rather than requiring 12, 13, 14 . . . hours of wind. The 8 peak hours and 16 off-peak hours model is explained below with reference to Table 1.

FIG. 2 shows the cold L-Air 550 and cold pressurized air 555 moving "up" from storage, with the warm inlet air 500 and dry air 520 moving "down" into storage. This is not only a diagrammatic convenience but it also mirrors the likely path of the outflow and inflow streams, because the high-pressure outflow stream can easily move "up" while the incrementally cooling inflow stream benefits from "falling down" as it gets denser from being chilled. For example, the cold flue 7 is designed to take advantage of the increasing density of the dry inflow air 520, allowing the air to fall, and thus reducing the pressure drop that would have occurred if the system were upside down or horizontal.

The stored L-Air 550 is released from storage and leaves the storage tank(s) 16 at −283° F. and approximately 70 psia by way of a cryogenic pump 13 that pressurizes the liquid by pumping it to a pressure of approximately 440 psia. It should be noted that other pressures would also work and would depend on the selected hot gas expanders and the design pressures under which the expanders operate. That pumping requires very little energy (approximately 0.08 MW) because a liquid is (virtually) incompressible and will achieve that pressure with very little energy input. The combined energy input of compressing the make up air (or the original inlet air 500) to moderate pressure and the pumping of the liquid air 550 to high-pressure, is substantially less than the energy required to compress the inlet air to a standard simple cycle gas turbine. Cryogenic pump 13 will be driven by pump motor 640 which will receive a small portion of the total power output of the VPS Cycle by cable 4. It should be noted that the pumped-to-pressure effect of the cryogenic pump 13 will yield "compressed" air, once the air is vaporized, and that the terms "pumped to pressure" and "compressed" cover the same state of "high-pressure" where the first term applies to the liquid state of the air, and the second term applies to the vaporized state.

The pumping of the L-Air 550 to approximately 440 psia raises its temperature slightly, to about −282° F. The high-pressure, cryogenic L-Air 550 then travels through the main heat exchanger 100, cooling incoming substantially liquefied make-up air 530 and becoming vaporized as it picks up heat from that incoming substantially liquefied air stream 530, and leaving the main heat exchanger 100 at approximately −220° F. The cold pressurized air 555 (formerly L-Air) is further warmed by the inflowing dry air 520 that has been compressed through two stages of compression. In the cold flue assembly and the other heat exchangers, the counter-flowing air streams are separated by the thin walls of plates (in a plate fin heat exchanger) that create the chambers in which the various fluids flow. Thus, the two air streams pass each other in adjacent chambers, the warm stream heating the cold stream through heat exchange by convection and conduction.

With respect to inlet air 500, the replacement method comprises compressing the inlet air and recovering the heat of compression. The first stage of compression for the inlet air 500 preferably occurs before it enters the molecular sieve assembly 10, using about 750 kW of power. The exit air from the first stage will be approximately 35 psia and about +240° F., due to the heat of compression which is captured in first inter-cooler 700. Much of that heat is recovered in heat exchangers 150 and sent to warm the out-flowing air prior to its arrival at the combustion chamber 2. The now approximately +40° F. air moves through the molecular sieve assembly 10 for its final "cleaning" where any remaining moisture and carbon dioxide are removed by adsorption in zeolyte or other equivalent product. Heat exchangers 150 are shown as separate heat exchangers to clarify the step-wise warming of the warmed pressurized air stream 560 by recovered heat. An alternative embodiment would integrate heat exchangers 150 into a single heat exchanger.

The second compression stage receives the inflowing dry air 520 after it exits the molecular sieve, and having been further cooled to approximately −110° F. by the out-flowing approximately −136° F. cold pressurized air 555. It should be noted that a single stage of compression of the air could work, but would likely yield reduced efficiency. Alternatively, three or more stages of compression could work and may yield better efficiencies but with added complexity and increased capital costs. The dry inlet air 520 is directed through a vertical cold flue assembly 7 having a top and a bottom so the air sinks downward from the top to the bottom. Then the approximately −110° F. inflowing dry air 520 is further compressed to a second pressure of approximately 75 psia. As discussed elsewhere herein, the selected pressure for the second stage of compression may vary and will depend on the design pressure and temperature of the stored liquid air in storage tank 16. Compressing cold (dense) air requires less power than compressing warm air. Thus, the second stage compression only requires approximately 0.53 MW of power. The outflow from the second stage of compression is only about +20° F., so there is no need (or practicality) for recovering the heat of compression. A small portion of the flash stream 535 is added to the dry inlet air 520, after which the combined stream is then cooled in main heat exchanger 100 such that it is substantially liquefied. As mentioned above, the dry inlet air 520 is cooled by cold pressurized air 555.

Pre-cooling heat exchanger 110 is shown in FIG. 2 as a location where the compressed inlet air stream 520 is pre-cooled on its way toward the main cryogenic heat exchanger 100. That cooling step may, alternatively, be accomplished in a single heat exchanger 100 that includes the function performed by pre-cooling heat exchanger 110. By separating the two cooling steps for stream 520 into two heat exchangers, (110 and 100), FIG. 2 can clearly illustrate how a small portion of the flash gas stream 535 might be returned to storage tank 16 via substantially liquefied air stream 530. Other illustration methods might show the same general principles of cold recovery using only one main cryogenic heat exchanger 100. The substantially liquefied inflowing air 530 is directed to a storage apparatus to replace at least a portion of the released liquid air 550. Valves 400 control the flow rates of various streams. However, for the sake of clarity, only the most essential valves are shown in FIGS. 1 and 2.

Power cable connections 4 are shown in several places in FIG. 2. One important configuration for such a power cable 4 is shown coming out of main generator 620, where the cable 4 is split in two directions. One portion is the power output that is sent to the electric grid or to an adjacent end-user. The second much smaller power stream is sent to various pumps and compressors shown in FIG. 2 with power cable 4 connections. Other cables, not shown, would connect to instruments, electrically operated valves and the like.

Shop fabricated L-Air storage tanks are readily available and are less costly, for small multiples, than field erected tanks of the same capacity. Horizontal tanks can be deployed in "sculpted earth" containment areas where a modest depression in the local grade level 25 is created to contain the tanks behind a modest berm that is assembled from the excavated material. Such a configuration will yield a very-low profile for the storage tanks. A minimum of three 75,000-gallon L-Air storage tanks is preferred for the model outlined herein. A fourth or fifth tank would substantially increase the storage and outflow options, allowing for extra input capacity during weekends and on windy nights and allowing for "excess air send-out" during high-demand periods, as discussed above. That extra degree of flexibility is achieved by the relatively low-cost and low-tech effort of adding one or two L-Air storage tanks to the basic three that are required to keep the inflow and out-flow modes in balance.

By the time the cold pressurized air 555 reaches the cold flue 7 it has been warmed up to approximately −136° F. The replacement and release method includes cooling the dry inlet air 520 entering the cold flue assembly by heat exchange with the released cold pressurized air 555 entering cold flue assembly 7 and warming the released vaporized liquid air by heat exchange with the dry inlet air 520 entering the cold flue assembly. The cold pressurized air 555 leaves the cold flue 7, still at a high pressure of approximately 434 psia, and at approximately −99° F. The still cold (approximately −99° F.) vaporized high-pressure air 555 is then sent to an aqueous ammonia "refrigeration storage" loop, where the cold air is heat exchanged in cold recovery exchanger 180 with warm aqueous ammonia, and the cold air leaving that heat exchanger at approximately −5° F. The Recovered Cold Storage Assembly shown in FIG. 2 captures in cold recovery exchanger 180 the cold in stream 555 and stores that cold in a cold storage medium 6 for use as supplemental refrigeration in independent refrigeration system 24, as discussed elsewhere.

The high-pressure released cold pressurized air 555 moves on to the main (large) generator 620 where it provides an important service. The released cold pressurized air 555 is directed to the main generator 620 and acts as a bearing for the rotating components of the generator, replacing oil bearing systems, providing a cushion of air, and helping to remove waste heat that is produced by main generator 620 by absorbing the heat. That waste heat, in turn, helps further warm the air stream, adding approximately 40 degrees of heat, to approximately +35° F. The next stop for the warmed pressurized air 560 are heat exchangers 150, which are linked to the outflow stream of the inlet air compressor 200 and first intercooler 700 as described above. The heat of compression is used here to further warm the warmed pressurized air 560 in steps from approximately +35° F. to approximately +55° F. and then to about +130° F. The air bearing main generator 620 is preferably contained in a sealed housing 11 which would contain the cold compressed air stream 555 that would support the rotating generator and would carry away the waste heat that the generator would produce.

In a final heat exchanger 170 the approximately +130° F. released formerly liquid air stream, now hot pressurized air 570, is warmed to approximately 1,420° F. using the recovered waste heat from hot gas expander 330 that is by a first portion of counter-flowing exhaust gas from hot gas expanders 330. The now hot pressurized air 570, formerly the released cold pressurized air 555 at about 1,420° F. and about 420-psia, and a fuel stream 12 are directed to the combustion chamber 2 where it helps combust the NG fuel stream 12 or any other appropriate fuel stream. The fuel stream may need to be compressed to match the pressure of the hot pressurized air 570. Such fuel compression would occur in fuel booster compressor 260 driven by second booster motor 650. The combustion gas, typically a hot, high pressure gas (approximately 425 psia), is directed to one or more hot gas expanders, shown here as first and second hot gas expanders 320, 330, and the expanders drive the main generator 620.

FIG. 2 shows fuel pipeline 9 delivering a fuel stream 12, which would be natural gas in some cases, to fuel booster compressor 260 that brings the pressure of the NG to the design pressure of expanders 320 and 330. Other fuel delivery methods would work equally well. For example, as an alternative to pipeline-delivered NG, the VPS Cycle can use landfill gas, anaerobic digester gas, or coal bed methane as a fuel source, or NG from a "stranded well" or "associated gas" that is found with oil wells. In some instances, the fuel stream would need no booster compression because, for example at some stranded gas wells, the pressure of the gas stream would be as high or higher than the design pressure for the expanders 320 and 330.

FIG. 2 also shows a fuel booster compressor 260 for the natural gas fuel stream 12, raising the pressure of that stream from, e.g., 60 psia to 425 psia, the same as the assumed pressure of the compressed air. That booster compressor uses very little energy (less than 0.2 MW) relative to the total output of the power plant. It will use even less energy if the fuel gas arrives at the site at a higher pressure, such as from a high-pressure regional natural gas transmission line or from a stranded gas field. Other fuels can be substituted for the NG at the appropriate rate (relative to the compressed air flow), yielding similar power output results. If wind were also available during the power output cycle outlined above, its energy would be added directly to the output of the power plant, rather than converted to L-Air.

The exhaust gas leaving the combustion chamber, or combustion gas, is about +2,000° F., but this high temperature is achieved with less fuel than in other cycles because the inlet air was pre-warmed to about 1,420° F. The approximately +2,0000° F., about 420-psia combustion gas is expanded in a two-stage hot gas expander 320, 330, first to approximately 80 psia and then down to about 15.5 psia. The somewhat cooled outflow from the first stage of expansion 320 is re-heated to about 2,000 psia at the combustion chamber, and sent to the second stage 330 (at 80 psia), leaving the second stage at approximately +1,440° F. and about 15.5 psia. A first portion of that hot exhaust is sent through final heat exchanger 170 where it warms the approximately +130° F. inlet air to about +1,420° F., as described above. The hot exhaust gas 5 arrives at the power plant's flue 18 at approximately +150° F., exiting to the atmosphere at approximately 14.8 psia. A second, smaller portion (e.g., approximately 5%) of the exhaust gas (a "slipstream") is sent to warm heat exchanger 140 to warm the vapor portion or sweep air 545 that cleans the mole sieve. This slipstream flow is controlled by exhaust gas control valve 420. That slipstream returns to the main exhaust gas stream 5, exiting as one through the flue 18.

It should be noted that approximately 8.5% of the substantially liquefied air 530 will "flash" as the liquid plus vapor enters storage tank 16. That vapor portion 535 of the substantially liquefied air, or flash stream, is directed from the L-Air storage tank 16 and travels (at approximately 70 psia) to the main heat exchanger 100. There, the vapor portion 535 acts as one source of refrigeration, the recovered cold being used to further cool the inflowing or dry inlet air 520 described above. The dry inlet air 520 also warms the vapor portion 535 of the substantially liquefied air. After cold recovery and further heating from recovered heat in warm heat exchanger 140, the now warmed sweep air 545 is directed to the molecular sieve assembly 10 where it is used as a "sweep gas" to remove the carbon dioxide and moisture that has been deposited on the molecular sieve assembly 10. The sweep gas that exits the molecular sieve 10 leaves the VPS Cycle by way of air vent 19. That sweep gas merely returns the CO2 and moisture content of the original inlet air 500 to the surrounding atmosphere. No additional CO2 or moisture is sent back through vent 19. In addition a second, smaller portion (e.g., approximately 5%) of exhaust gas 5 from the one or more hot gas expanders 320, 330 is used to warm the sweep air 545 (the first, larger portion of exhaust gas 5 warms the released hot pressurized air stream 570).

FIG. 2 shows flash air return booster 250 which takes a small portion of the cold flash air stream 535 that is not needed to sweep the molecular sieve 10, and sends that flash air stream back toward storage tank 16, thus recovering a small cold and clean air stream. Booster compression is needed in order for the recovered flash air to join the slightly higher-pressure stream 520. Flash air control valve 410 will determine how much of the flash air stream 535 moves on toward the molecular sieve, and how much is returned through flash air return booster 250 to storage tank 16. Booster motor 630 will drive the booster compressor, using a small portion of the VPS Cycle's total power output, which would be delivered to the motor by cable 4.

The outflow cycle does not need an absorption chiller to operate because the vaporized L-Air contains more than enough refrigeration to fully cool the counter-flowing incoming replacement air. Thus, all low-grade heat can be applied to the pre-warming of the vaporized air stream that is traveling toward the combustion chamber and the hot gas expander. An important point is that the compression steps performed during release of stored energy are powered by a portion of the power output occurring during the release process. In addition, the cooling steps of the release process are powered by recovered cold from the released vaporized liquid air. It should be noted that the compression and cooling steps performed during replacement of stored energy may be powered by one or more power production or energy conversion sources, which include, but are not limited to, wind power when such power is available, power from an electric grid or an independent power plant, nuclear, coal, geothermal, solar, hydropower, landfill gas, anaerobic digester gas, coal bed methane, associated gas, recovered heat from large industrial plants, recovered cold from liquid natural gas import terminals, wave and tidal energy.

As mentioned above, the hotter the inlet air to the combustion chamber, the less fuel is required. Another variation would send an "excess flow" of compressed air to the combustion chamber, which would result in cooler outflow temperatures, slightly less power output (but not much less because the increased mass flow through the hot gas expander would somewhat offset the cooling effect), and which would yield a more favorable balance of stored wind to fossil fuel as the components that travel through the power-generating expander. This variation would be "greener" than the standard model because the stored wind would represent a greater portion of the power output cycle and because the total power output would be based on a lower fuel use, which would yield directly proportional reductions in the absolute amount of emissions.

In short, the VPS Cycle's hot gas expander can operate at a wide range of gas flow rates, at various temperatures and with various proportions of air to fuel, making it exceedingly flexible as to what portion of the net power output is derived from stored wind and what portion is derived from the burning of a fossil fuel. The software that controls the more mundane aspects of the plant's operation would also select the optimum operating parameters for the facility incorporating the VPS Cycle. Periodic audits could fully account for the actual power sent out (MWH) and the actual amount of fossil fuel used during all time periods, to establish the actual green component of the storage and send-out system. Such an audit would provide certainty and transparency to those that purchased the power or any "green credits" that it might generate.

If an excessive number of windless days and nights have depleted the L-Air in storage, than the cycle described in FIG. 2 may be run for some period during off-peak hours, including on weekends. Instead of sending the power output to the grid, the power would be used to run the equipment shown in FIG. 1, allowing low-value power to be stored for high value release and allowing the power plant to meet its "firm" commitments to its power customers. The other option, as discussed elsewhere, is to purchase low-cost off-peak power from the grid and use that purchased power to drive the air compressors and the refrigeration loop in FIG. 1.

TABLE 1

POWER OUTPUT SCENARIO

| | PREFERRED EMBODIMENT 2-Stage with Reheat |
|---|---|
| Off-peak (night) Hours | 16 |
| Peak (day) Hours | 8 |
| Liquid Air (L-Air) in Storage (Gallons) | 225,000 |
| Minimum Storage Tanks at 75,000 G/tank | 3 |
| Weekdays per year | 255 |
| Weekend days per year | 104 |
| Holidays per year | 6 |
| Peak Hours Per Year | 2,040 |
| Off-peak Hours Per Year (a.) | 6,720 |
| Annual Peak Hours as % of total | 23.29% |
| Annual Off-peak Hours as % of total (a) | 76.71% |
| L-Air Production Capacity | |
| Maximum Daily Off-Peak L-Air Production (G) | 152,000 |
| Max. Weekday L-Air Production Rate (G/Hr.) | 9,500 |
| Compression Energy Required (MW) | 1.3 |
| Refrigeration Energy Required (MW) | 10.4 |
| Total Energy Required at Max. Rate (MW) | 11.7 |
| Total Energy Required at Max. Prod. (MWH) | 187.2 |
| Energy Input Required (MWH/Gallon) | 0.0012 |
| Energy Input Required (kWH/Gallon) | 1.232 |
| VCA Power Production (With No Daytime Wind) | |
| Gross Power Output (MW) | 19.08 |
| Compressor and other on-site power demand (MW) | 2.14 |
| "Firm" Power Output, Net (MW) (b.) | 16.94 |
| "Firm" Power Output, Net (MWH) (b.) | 135.52 |
| L-Air Outflow per Hour (G) | 21,200 |
| L-Air Outflow (G) | 169,600 |
| L-Air Inflow to Storage, per Hour (G) | 8,333 |
| Total L-Air Inflow to Storage (G) | 66,664 |
| Off-peak L-Air Production | |
| Minim. Makeup to Storage Required (G) | 102,936 |
| Minim. Hours of Wind Required | 10.84 |
| Min. Annual Hrs. of Wind as % of Off-peak Hrs. | 41.9% |
| "Best Case": Peak Power Out With Max. Stored Wind + Daytime Wind | |
| Net Peak Power Out From VCA Cycle (MW) | 16.94 |
| Daytime Wind Power (MW) | 11.70 |
| Total Peak Power Production (MW) | 28.64 |
| Max. Peak Power Produced (MWH) | 229.12 |
| Peak Period Wind as a % of Total | 40.85% |
| "Green Percentage" of Wind | 100% |
| "Green Percentage" of VPS Cycle output (d.) | 65.90% |
| Weighted "G. %" of Max. MWH Out | 79.83% |
| Annual "G. Percentage" of MWH Out (e.) | 72.87% |

Notes:
(a.) Large number of off-peak hours surround the 5-daily 8-hour peak periods.
(b.) Firm power can be guaranteed, but the % of "green" power will vary.
(c.) If not enough off-peak wind is available, NG-fueled power provides missing L-Air.
(d.) Based on wind's contribution to VCA Cycle thermal efficiency.
(e.) Assumed peak wind is only available during 50% of annual peak output periods.

Table 1 provides an example demonstrating the VPS Cycle's calculated potential power output at one selected power storage and release scale. This example shows a basic VPS Cycle producing 8,333 gallons of L-Air per hour during the power send-out mode and 9,500 gallons per hour during the off-peak storage mode. Within the 8/16 peak/off-peak framework outlined herein, approximately 135.5 MWH of power output can be sold on a "firm" basis, even if no wind blows during any peak output period. (As discussed herein, that output will be nearly 66% green.)

In establishing "peak" and "off-peak" periods, within a 24-hour daily cycle, one can select 8 hours for the peak (daytime) power output and 16 hours for the off-peak energy storage process, as shown on Table 1. However, market conditions will vary at each VPS Cycle deployment, such that the peak/off-peak split might be 9/15, 10/14, or 7/17. That split may vary seasonally and over the life of each VPS Cycle deployment. Shorter peak periods will tend to capture the highest unit price ($/MW) for the power, but will send out fewer megawatt-hours of energy, unless the size of the equipment is increased over the assumed sizes in Table 1. The optimum duration of the peak power output period will be based on a selected balance between the unit price of the power and the total send-out period, optimizing the power plant's revenue stream. That optimization may vary seasonally and over an extended period.

Each VPS Cycle deployment will likely be based on a site's "wind history", accounting for day/night and seasonal patterns, which would be projected forward, and compared to peak electric demand that would also account for day/night and seasonal patterns. The total amount of L-Air storage chosen for each VPS Cycle deployment will balance the need for certainty and wind-reliability against the cost of storage (tanks, valves, and piping), within the limitations of the land area available for the storage system.

As shown in Table 1, the wind need not blow the full 16 hours in order to keep the storage and outflow process in balance. With an off-peak L-Air production capacity of 9,500 gallons per hour, less than 11 hours of off-peak wind are needed to keep the systems in balance, with no wind required during the daytime peak periods. On a daily basis, the 10.84 hours of wind-driven L-Air replacement represent less than 68% of the 16-hours available during off-peak period. Thus, the site selection for deploying the VPS cycle would require wind availability during 68% of those off-peak (nighttime) 16 hours. However, on an annual basis, assuming adequate L-Air storage capacity, the 5 daily 10.84 hours of off-peak weekly storage, over a 52 week period=10.84×5×52=2,818 annual hours of off-peak wind storage out of a total of 6,720 annual off-peak hours or 2,818/6,720=41.93% of the available off-peak hours.

Thus, sites with wind blowing during less than 42% of the off-peak hours can generate a predictable and firm amount of peak power output, even if no wind blows during the peak output periods. This is an important benefit associated with the VPS Cycle. Instead of looking for sites with 40%, 50% or higher daytime wind output, wind power developers can now look to sites where daytime wind is available for significantly shorter periods, even approaching zero hours, as long as nighttime and weekend wind availability approaches 45%. With somewhat larger sized equipment and additional storage, sites with even less wind may be suitable for VPS Cycle deployment.

If the value of wind (because it is green) is high enough, then the VPS Cycle (with its ability to store the energy of the wind) may be economically deployed in areas where off-peak wind is generally available only for about 35% of the weekly hours. That possibility can expand the existing "geographic viability" of wind farms to areas that do not generally have enough peak period wind to justify the deployment of wind turbines, absent the VPS Cycle.

The example shown in Table 1 can be adjusted to reflect different values for peak power and for power with a higher percentage of wind. One example would send out an "excess" amount of air, where more vaporized air is sent to the hot gas expander than normal. The "excess air" option will yield a slightly lower total MWH output but a higher green percentage. Other scenarios can be deployed on a case-by-case basis where the general availability of wind is matched to the size of the VPS cycle's components and the amount of L-Air storage capacity provided.

The VPS Cycle can achieve close to 100% reliability and a greater than 50% green percentage because it can store the wind. By integrating wind production and storage with a modified natural gas fueled turbine, the fossil-fueled equipment needed by VPS Cycle does not need to be fully redundant relative to the capacity of a given array of wind turbines.

Full redundancy is avoided because the VPS Cycle takes a front-end compressor and places it mostly in the service of storing the wind, and to a lesser extent, in compressing make-up air during send-out. In that way the compressor portion of the system is busy all the time and needs less work input to achieve the same goal. In other words, the two portions of the VPS Cycle (the L-Air storage portion and the power send-out portion) are not redundant, one backing up the other, but more efficient manifestations of the front-end compressor, integrating the power storage and power send-out functions of the VPS Cycle. The VPS Cycle separates the power storage mode from the power send-out mode into two distinct "batch processes".

There are several methods for calculating the "stored" wind's contribution to the peak period power output. The method selected here identifies the role of the NG in the power that is sent out and separates that from the role of the wind. This approach compares the heat rate (natural gas use) of the VPS Cycle's power send-out system with that of an equivalently sized simple cycle power plant. A typical 15 to 20 MW Gas Turbine (GT) has a 37% thermal efficiency. It should be noted that NG is used in this application to denote fuel, but any appropriate fuel may be used instead of NG.

TABLE 2

VPS CYCLE POWER OUTFLOW THERMAL EFFICIENCY

|  | PREFERRED EMBODIMENT 2-Stage Exp. With Reheat |
|---|---|
| Gross Power Output (MW) | 19.08 |
| Gross Power Output (KW) | 19,080 |
| Generator Loss, 3% | 572.4 |
| Net power Output - Thermal | 18,508 |
| Auxiliary Power, KW (air Comp, Gas Booster, etc.) | 1,570 |
| Net Power Output (MW) - Electrical | 16.94 |
| Net Power Output (KW) - Electrical | 16,938 |
| Inlet Gas Temperature to Combustion Chamber (F.) | 1,420 |
| Combustion Gas Exit Temperature (F.) | 2,000 |
| Average Heat Capacity at 1,440-2,000° F. (BTU/LB-Mole/deg. F.) | 8.1 |
| Flow to Hot Gas Expander (LB-Mole/H) | 5,670 |
| Required Heat Input (BTU/Hr.) | 53,275,320 |
| Natural Gas Heating Value (BTU/SCF) | 900 |
| Required NG Flow Rate (SCF/Hr.) | 59,195 |
| Thermal Efficiency | 108.51% |
| Thermal Efficiency of Standard Simple Cycle | 37.00% |
| GREEN PERCENTAGE of VPS CYCLE | 65.90% |

Table 2 provides an example of the calculated thermal efficiency of the VPS Cycle, based on the selected scale of power storage and release shown in Table 1. The thermal efficiency of the VPS Cycle was calculated in the following manner. The hot gas expander requires 5,670 M/H (mole per hour) of combustion gas at 2,000° F. to generate 19.08 MW (OR 19,080 KW) of gross power output. The net output for this case is 16.94 MW (or 16,938 KW), accounting for internal losses and the required power to run compressors, pumps, etc., totaling 2.14 MW. The combustion gas must heat up from approximately 1,420° to 2,000° F. in the combustion chamber, which is a "delta" of 2,000–1,420=580° F. The average heat capacity over that temperature range is 8.1 BTU/LB-Mole/degrees F. (a lb-mole is 380 SCF). In the preferred embodiment, the hot gas (product of combustion) is expanded in a two-stage (2) expander. The required heat input is therefore 5,670 LB-Mole/H×8.1×580 degrees F.×2=53,275,320 BTU/Hr. With the natural gas fuel having a net heating value of 900 BTU/SCF, the required flow rate is 53,275,320/900=59,195 SCF per hour. The Thermal Efficiency is therefore 16,938×3,413 BTU/kWh/59,195 SCF of NG per hr./900 BTU/SCF×100=108.51%. It should be noted that 3,413 BTU is a value known to those skilled in the art and is derived from the equation: 1 kW=860,000 cal/hr/252 cal per BTU=3,413 BTU per kWh.

The difference in thermal efficiency between the VPS Cycle and a standard simple cycle gas turbine is 108.51–37=71.51. The "green percentage" of the VPS Cycle is 71.51/108.51=65.90%, or nearly 66%. Thus, the VPS Cycle will be nearly 66% green and 100% reliable, without needing two fully redundant power-generating systems, and accounting for no wind production during the daytime peak power output period. As demonstrated above, the "66/100" achievement can be accomplished at sites with wind activity during only 42% of the annual off-peak hours, allowing for a wide deployment of the VPS Cycle.

The VPS Cycle allows a good deal of flexibility in its operation. For example, the power output range of most hot gas expanders can extend over a +50% range. In other words, the Cycle can send out from 100 units to 150 units of power, without any significant efficiency or capital cost penalties. Some sites will have consistent wind patterns that favor nighttime storage, offset by daytime lulls. Other sites will experience seasonal variations in the total amount of wind and the time periods when it is available. The capacity to store that variable energy, and the capacity to release it at different rates makes the VPS Cycle especially useful.

Another variation, introduced above, concerns the storage of weekend wind for weekday release. Computer modeling for each VPS Cycle deployment will design outflow schemes where the extra weekend wind (stored as L-Air) may be parsed out over the entire week, or sent out in larger flows on Monday and Tuesday. The software will account for anticipated power demand, power values, and the projected near-term wind activity, which will replace the sent-out L-Air.

If the software suggests a "maximum" send-out, either to make room in the storage tanks for imminent new L-Air (based on weather forecasts), or to capitalize on a spike in power demand and value, the VPS Cycle can respond by sending a higher percentage of air than would be "normal". For example, if the standard compressed air to fuel ratio is 97/3, then during "excess air send-out" the ratio might be 97.5/2.5. The hot gas expander would operate at slightly cooler temperatures, sending out less power, but using less fuel, and yielding "greener" power.

Other operational and design optimizations of the VPS Cycle can achieve even higher degrees of greenness than outlined above, while maintaining 100% reliability. For example, winter (cold weather) operations will reduce the power needed to compress the inlet air to the L-Air production system (because colder air is denser); but hot weather operations will not increase the compression required because of the use of an absorption chiller to pre-cool the inlet air to the compressor. During the off-peak inflow cycle the nighttime air may be as cold as zero-degrees F., containing very little moisture, and being significantly denser than the, e.g., 80° F. inlet air temperature on a summer night. The power required to compress such cold inlet air will be significantly less than required to compress 80° F. air. That benefit would allow the equipment to operate at the same power input rate but with a higher air inflow, yielding more stored L-Air during the same hours of wind, or allowing for the same amount of stored L-Air in fewer hours. Similarly, if the inlet air during the daytime peak output period is colder, more of the cold content of the outgoing L-Air can be recovered and stored for off-peak use than under the summer conditions.

To the extent that wind farms include offshore installations, the VPS Cycle may be deployed adjacent to such an offshore group of turbines, for example, on a barge or on a man-made island, but only if an under-sea natural gas pipeline serves the site. The same power grid that would distribute the output of the wind turbines would distribute the output from storage. Alternatively, and where undersea gas pipelines are not available, the facility incorporating the VPS Cycle may be located on land, adjacent to a gas pipeline, connected by power cables to the offshore wind farm. Wind power would be "collected" offshore as electricity, sent to shore for storage, and released later with the "assistance" of the NG fuel source. In that model the wind turbines would not be connected to the grid, but rather to the VPS facility, which would be the transfer node between the wind turbines and the grid.

In yet another embodiment, the wind turbine(s) would be integrated with offshore oil and gas platforms, which would have ready access to "associated gas" that would normally be flared. In that model the flared gas would drive the equipment shown in FIG. 1, augmented by any available wind, with the produced energy stored as L-Air, and released during the peak demand period, and sent to shore by power cables. That configuration would convert a wasted resource (flared gas) and an untapped resource ("green" but uncertain wind) into a "firm" and high-value mostly green product.

A variation of the previous embodiments would "gather" compressed air produced at each offshore wind turbine into a single underwater pipeline, which would deliver the cooled (by the ocean) compressed air to a shore-based VPS cycle storage and outflow system. In that model, there would be no power cable connections from the offshore turbines to the land-based facility, only the compressed air connection.

The VPS Cycle is not limited to storing wind power. The embodiments shown herein could apply to a deployment at a standard power plant (fueled by any fuel), where off-peak, low-value power needs to be stored for peak period, higher-value release. In such deployments the power plant's generator would replace the wind turbines, with off-peak output driving the L-Air production and storage system. Alternatively, low-cost off-peak power from the grid would drive the equipment of the system.

For example, at Landfill Gas (LFG) sites where the LFG is used as the fuel to produce power in a turbine, the VPS Cycle would allow that 24-hour production cycle to be reserved for sale during the highest value (e.g., 8) peak hours, thus substantially increasing the revenues derived from power sales. Similarly, ADG and coal bed methane (CBM) sites can benefit from 24-hour production with only 8 hours of high-value sales. The combination of the VPS cycle and LFG/ADG as a fuel source would yield a highly efficient, and very "green" system, with a "renewable" source of fuel, delivering its output during only the highest value periods. That combination would likely make that power storage/output system very competitive against standard models.

In alternative embodiments of the invention, the release and replacement assembly may be integrated with a peak-shaving power plant. One solution to the higher cost of peak (daytime) power is the construction of peak shaving power plants that operate only during high-demand (high-cost) periods. Such "peakers" tend to be simple cycle gas turbines because they operate at smaller scales (e.g., 10 MW) than base-load combined cycle power plants, which produce hundreds of megawatts of power.

The "integration" would be viable for existing peak-shaving plants, by adding (retrofitting) the VPS Cycle, and for example, allowing the hot compressed air stream that the VPS Cycle yields to reach the existing combustion chamber of the in-place peaker, reducing its need to compress inlet air. In a "new construction" option, the VPS Cycle, as described in the present invention, would serve the peak-shaving function entirely. The VPS methods and systems generally can be used with peak-shaving plants. The VPS Cycle adds a new dimension to existing and future peakshaving power plants, by allowing the facility to store low-cost off-peak power for later release. In the optimum model, the off-peak power (delivered at night) is "guaranteed" to come from off-peak wind, hydroelectric power, LFG-to-kW and other renewable sources, delivered by the standard electric grid (when demand is low), across some distance, and stored at the peakshaving site. Thus, the nighttime storage mode would be as "green" as if the peaking plant were located at the base of a wind turbine, producing no emissions during the power storage mode. The nighttime power purchase would be less costly than standard daytime peak power production, even if a premium were paid for green power.

The following are some of the more significant benefits of integrating the VPS Cycle with peak-shaving plants: use less fuel per kWh of power output, lowering costs; produce less emissions per kWh; tap into the green power market and provide a steady customer base for off-peak green and renewable energy; by combining local production with grid power, lower the losses common in the grid transmission of electricity; by reducing fuel cost, emissions, and transmission losses, lower the net cost of power to the customer; and reduce daytime load on the grid, preventing brownouts and mitigating the need for new large power plants and extensive grid improvements. In some contexts where the cost per kWh of peaker output is low enough, compared to peak power costs from the grid, peak-shaving plants can reduce the annual cost of power to the end-user and help mitigate capacity limits on older portions of the electric grid.

The daytime power release via the VPS Cycle, using local pipeline delivered natural gas, would result in approximately 66% green power. The much reduced fuel use (one third of what a standard peaker would use) will substantially reduce operating costs. The local emissions per kWh of power output would also be two thirds lower than for a standard peaker.

Embodiments of the present invention can also be integrated with Distributive Generation (DG) models. DG is another model for local power production, in some ways similar to peak-shaving. The fundamental goal of DG is to substantially improve the basic means of power production and distribution, by placing production as close to the end user as possible, and using the best available power generating technology. DG is also more receptive to integration with local renewable power, such as wind, solar, biomass, ADG and the like.

Benefits of DG include reduced pressure on the grid, local control over power production, and the potential integration with renewable power sources. The integration of the VPS Cycle with standard DG models, at a scale of, e.g., 5 MW or greater, can substantially enhance DG by leveraging those benefits. All of the features outlined above, for the integration of the VPS Cycle with peak-shaving plants, apply to DG models. The long-distance transfer of wind-generated power (known as "wheeling") allows both the VPS-peakshaving and VPS-DG models to "store" off-peak wind power produced at great distances from the wind farm, for local release during peak demand periods. Thus, the wheeling can occur when the electric grid is not overloaded, and allows many distant wind farms to feed power to diverse VPS cycle storage sites. It should be noted that the VPS cycle allows power to be transmitted during off-peak periods and stored near the point of end use. Thus, the VPS Cycle can help to alleviate the problem of transmission lines becoming "clogged" or overloaded (particularly as it relates to transmitting intermittent power, like wind power) by allowing power to be stored near the point of production or near the point of consumption (or at any point in between). Under that scenario, the VPS Cycle actually "pays double" by allowing the power production assets to be utilized more efficiently during off-peak periods and allowing the power transmission assets to be utilized more efficiently during off-peak periods.

An industrial or office park, a computer networking facility, a large retail center, an educational or health care campus, or any large users of daytime electric power, could install a VPS Cycle power plant that would function as an improved DG facility. Instead of just "producing" local power, the plant would produce and store power. The storage capacity would allow off-peak "inflow" to occur from the grid at lower costs than the DG plant might be able to achieve by itself and from "greener" sources than the DG plant.

By staying connected to the grid, the VPS DG plant would always have an emergency back up, and would, on occasion, be able to sell power back to the grid, reducing the need for large-scale power plant construction. For facilities that normally require emergency back up generators (hospitals, public buildings, data processing centers, etc.) the VPS DG model would eliminate that equipment, because the VPS Cycle can produce power even if the grid is down, as long as the natural gas system is functioning. (The likelihood of both the power grid and natural gas grid being down is very remote.) The elimination of standard back up generators will reduce the capital and operating costs of redundant equipment, and eliminate the need for diesel fuel tanks that normally serve as the fuel storage mode for back up generators.

Flared gas recovery (to produce power) is also an option at land based facilities. The VPS Cycle would allow such sites to increase the value of the produced power by first storing it during off-peak periods, and then releasing the power during peak demand periods. That model replaces the flaring with a power send-out system, but does not require any special clean up of the formerly flared associated gas (because gas turbines are not especially sensitive to the quality of the fuel), and does not require any gas pipeline connection to be made to allow the associated gas to reach a market. Instead, the gas is converted to power, and sent to market by power lines, but at the optimum hours of each daily cycle.

Embodiments of the VPS Cycle can be deployed at stranded gas fields. In this context, stranded gas is natural gas that is either low quality, or too distant from an existing natural gas pipeline to allow the gas to be sent to market. In many instances, the stranded natural gas is abundant, with extensive "reserves", and is often found at high-pressure. Low-BTU content gas, (not "pipeline-quality"), with excessive CO2 or N2 content, is easily burned in an appropriately calibrated gas turbine's combustion chamber in the presence of an appropriate amount of hot compressed air. The VPS Cycle would allow such untapped, low-quality resource to be converted to high-value power, which can be sent to market by connecting the site to a nearby electric grid. A further embodiment would include wind turbines at the stranded gas location, allowing more of the sent-out peak-period power to be derived from wind, but allowing the stranded gas to be the heat source for the send-out mode, as outlined in the general description of how the VPS Cycle functions. In both embodiments, the VPS Cycle would enhance America's energy independence, and to the extent wind is available, improve the ratio of green energy relative to fossil-fuel generated power.

Another possible deployment option for VPS Cycle power storage and release systems would be at existing and future base-load power production facilities. In that context, a portion of the low-value off-peak power production capacity of the base-load power plant would be diverted to the VPS Cycle storage system, and released during daily peak power demand periods. That siting of the VPS Cycle at the base-load power plant would not preclude the delivery of off-peak wind-generated power (by wheeling) to the VPS storage system. Indeed, such "green power" (including from LFG- and ADG-fueled power plants some distance from the base-load facility) would be gathered by the base-load power plant's VPS Cycle, and then distributed to end users along the same electric grid now used to link the power plant to its customers. However, in that model, the delivered power would have a significant "green percentage". The extent to which "wheeled" renewable power contributed to such a storage scheme at a base-load facility would depend on the availability and pricing structure of the off-peak renewable power, and the value of an increased "green percentage" for the power that would be sent out during the peak demand periods.

In short, the VPS Cycle is neutral as to siting options, allowing it to be near the renewable power source (wind, LFG, ADG), near a base-load power plant, or near an end-user, including a mid-scaled distributive generation facility. Thus, the VPS Cycle can enhance all segments of the electric power production and delivery industry.

Thus, it is seen that energy storage, release and replacement systems and methods are provided. It should be understood that any of the foregoing configurations and specialized components may be interchangeably used with any of the systems of the preceding embodiments. Although preferred illustrative embodiments of the present invention are described hereinabove, it will be evident to one skilled in the art that various changes and modifications may be made therein without departing from the invention. It is intended in the appended claims to cover all such changes and modifications that fall within the true spirit and scope of the invention.

What is claimed is:

1. A method of producing liquid air comprising:
    directing inlet air into a vertical cold flue assembly having an air inlet at or near its top into which the inlet air is directed and an exit at or near its bottom;
    cooling the air within the cold flue assembly and removing a portion of moisture from the air within the cold flue assembly;
    directing the air out the exit of the cold flue assembly;
    compressing the air;
    removing the remaining moisture and carbon dioxide from the air by adsorption;
    cooling the air in a main heat exchanger such that the air is substantially liquefied, the cooling substantially performed by a refrigerant air stream; and
    directing the substantially liquefied air to a storage apparatus.

2. The method of claim 1 further comprising the steps of:
    directing a vapor portion of the substantially liquefied air from the storage apparatus to the main heat exchanger; and
    using the vapor portion of the substantially liquefied air to cool the inlet air.

3. The method of claim 2 wherein the adsorption step is performed by a molecular sieve assembly and further comprising:
    using recovered cold from the vapor portion of the substantially liquefied air to further cool the inlet air;
    warming the vapor portion of the substantially liquefied air by using heat from the inlet air; and
    directing the vapor portion of the substantially liquefied air to the molecular sieve assembly such that the vapor portion of the substantially liquefied air removes carbon dioxide and moisture from the molecular sieve assembly.

4. The method of claim 1 further comprising the steps of:
    directing the refrigerant air stream from the main heat exchanger to an independent refrigeration assembly;
    compressing the refrigerant air stream to a first pressure and recovering the heat of compression;
    compressing the refrigerant air stream to a second pressure and recovering the heat of compression;
    cooling the refrigerant air stream;
    directing the cooled refrigerant air stream to the main heat exchanger; and
    warming the refrigerant air stream in the main heat exchanger using heat from the inlet air.

5. The method of claim 4 wherein the independent refrigeration assembly comprises:
    a plurality of compressors to compress the refrigerant air stream; and
    a plurality of expanders to cool the refrigerant air stream;
    wherein refrigerant flows from the independent refrigeration assembly to the main heat exchanger to cool the inlet air;
    the refrigerant exits the main heat exchanger and flows back to the independent refrigeration assembly;
    the refrigerant is compressed by the plurality of compressors and the heat of compression is recovered by the independent refrigeration assembly; and
    the refrigerant is cooled by the plurality of expanders and by heat exchange with a cold storage medium and flows back to the main heat exchanger.

6. The method of claim 5 wherein the compression and cooling are powered by one or more power production or energy conversion sources.

7. The method of claim 1 further comprising the steps of:
    recovering the heat of compression from the compressed air and directing the recovered heat of compression to an absorption chiller to drive the absorption chiller;
    directing refrigerant from the absorption chiller to the cold flue assembly to cool the air entering the cold flue assembly, the absorption chiller fluidly connected to the cold flue assembly.

8. A method of releasing and replacing stored energy comprising:

compressing inlet air to a first pressure and recovering the heat of compression;

removing moisture and carbon dioxide from the air by adsorption;

directing inlet air into a vertical cold flue assembly having an air inlet at or near its top into which the inlet air is directed and an exit at or near its bottom;

releasing liquid air from storage and pumping it to pressure;

directing the released liquid air through a main heat exchanger and vaporizing the liquid air by exposing it to heat from the inlet air;

cooling the inlet air within the cold flue assembly with the released vaporized liquid air and warming the released vaporized liquid air within the cold flue assembly with the inlet air;

compressing the inlet air to a second pressure;

cooling the inlet air in a main heat exchanger such that the inlet air is substantially liquefied, the cooling performed by the released liquid air; and directing the substantially liquefied inlet air to a storage apparatus to replace the released liquid air.

9. The method of claim 8 further comprising the steps of:

directing a vapor portion of the substantially liquefied inlet air in the storage apparatus to the main heat exchanger; and using the vapor portion of the substantially liquefied inlet air to cool the inlet air.

10. The method of claim 9 wherein the adsorption step is performed by a molecular sieve assembly and further comprising the steps of:

using recovered cold from the vapor portion of the substantially liquefied air to further cool the inlet air;

warming the vapor portion of the substantially liquefied air by heat exchange with the inlet air;

directing the vapor portion of the substantially liquefied inlet air to the molecular sieve assembly; and using the vapor portion of the substantially liquefied inlet air to remove the carbon dioxide and moisture from the molecular sieve assembly.

11. The method of claim 8 further comprising directing the released vaporized liquid air to a generator and using the air as a bearing for the rotating components of the generator.

12. The method of claim 11 further comprising the steps of:

removing heat produced by the generator by absorbing the heat in the released vaporized liquid air;

warming the released vaporized liquid air using the recovered heat of compression and exhaust gas from one or more hot gas expanders, the released vaporized liquid air having been compressed;

directing the released vaporized liquid air and a fuel stream to a combustion chamber, and combusting the fuel with the released vaporized liquid air;

directing the combustion gas to the one or more hot gas expanders, the expanders driving the generator.

13. The method of claim 12 further comprising the steps of:

using a first portion of exhaust gas from the expander to warm the released vaporized liquid air; and using a second portion of exhaust gas from the expander to warm the vapor portion of the substantially liquefied inlet air, which removes carbon dioxide and moisture from the molecular sieve assembly, the second portion of exhaust gas being smaller than the first portion.

14. The method of claim 13 wherein the compression and cooling steps during replacement of stored energy are powered by one or more power production or energy conversion sources.

15. The method of claim 13 wherein the compression steps during release of stored energy are powered by a portion of the power output occurring during release; and the cooling steps during release of stored energy are powered by recovered cold from the released vaporized liquid air.

* * * * *